May 3, 1932.    H. HALPERIN ET AL    1,856,480

SHEATH BONDING SYSTEM

Filed March 14, 1931

Witness:
William P. Kilroy

Inventors
Herman Halperin
Kenneth W. Miller

Patented May 3, 1932

1,856,480

UNITED STATES PATENT OFFICE

HERMAN HALPERIN AND KENNETH W. MILLER, OF CHICAGO, ILLINOIS

SHEATH BONDING SYSTEM

Application filed March 14, 1931. Serial No. 522,546.

This invention relates to sheath bonding systems and to sheath bonding transformers, being more particularly concerned with the bonding of sheaths of underground transmission cables, especially single phase cables of a three phase transmission system. The purpose of sheath bonding, it may be mentioned, is to eliminate, or to substantially reduce, sheath losses, and to reduce sheath potentials.

Induced voltages on the lead sheaths of single conductor underground alternating power cables have been reduced where necessary to values unobjectionable from a corrosion standpoint or other practical considerations by means of sheath bonding transformers connected to the cables in various manners. In our pending application, Serial No. 236,634, filed November 30, 1927, patented June 9, 1931, No. 1,809,591, we show a new sheath bonding arrangement and transformers suitable for such purposes. Each cable sheath is divided into sections which are electrically separated from one another by means of insulating sleeves. The greatest voltage reduction is obtained by a series connection in which an impedance coil is connected across the insulating sleeve of the insulated section of the sheath on each phase and the mid-point of the several phase coils of the respective cables are interconnected and preferably grounded. Such arrangements have been found to be quite satisfactory in a system wherein the lengths of cable sheath between insulating points are all substantially equal throughout. If, as is generally the case, the lengths are unequal certain conditions are introduced which, while they are generally of insufficient magnitude to produce any objectionable effect, carry certain objectionable possibilities in certain extreme cases where the inequalities in successive cable lengths are in a certain order.

If the cable lengths between successive insulating points are all equal, the voltage will build up along each sheath length to twice the value of the voltage across each half coil, and since the coil mid-tap at each end of the length is at ground potential, the magnitude of the voltage between the sheath and ground at each end of the length is only one-half of the total value induced in the length of the sheath. If both halves of each phase coil are wound upon the same core leg there is a very high mutual magnetic coupling between the two coil halves of each phase taken in pairs. If now the conduit or cable lengths are not equal it is found that the maximum voltage appearing on the sheath at some particular section may vary considerably from one half the induced voltage for the individual lengths. This is due to the magnetic coupling between the two half coils of each phase of the transformer which forces the two half coil voltages to be nearly equal in magnitude. Whatever voltage is applied by a first length of cable to one half coil must, by induction, appear in the other half and be applied to the succeeding length. In such an arrangement an unfavorable sequence of unequal conduit lengths may result in voltage reductions less than fifty per cent at one end of any given cable length and more than fifty percent at the other end. The voltage reduction will, in general, average fifty per cent for a section of line, but it is to be noted that it is the maximum voltage, rather than the average voltage, which is to be controlled.

It is one of the objects of the present invention to overcome the difficulty caused by the large mutual coupling between adjacent cable sections. We have discovered that it is the magnetic coupling between the coils of the adjacent cable sections that introduces the difficulty above mentioned and we have devised a sheath bonding system wherein this large mutual coupling is eliminated or substantially reduced. This may be accomplished by winding the two halves of each coil upon separate magnetic structures or, if they are wound upon the same magnetic structure the equivalent result may be obtained by separating the two halves of each coil and adding a flux leakage path between the transformer core legs of each phase at the point of separation. By this means the three phase series transformer becomes, in effect, two star connected transformers electrically interconnected at the star point and magnetically independent, although the two star transformers have a common intermediate core member.

As pointed out in our above referred to application and in our applications, Serial No. 441,906, filed April 5, 1930, and Serial No. 456,888, filed May 29, 1930, the best results are obtained by providing an arrangement wherein the impedance of the coils is rather high during the normal operation of the system and is reduced to a negligible value upon the occurrence of unbalanced conditions and that this is accomplished by providing the transformers with a delta connected secondary winding which may take the form of a closed loop surrounding all three phase legs of the transformer core. It is a further object of the present invention to provide an improved arrangement of the secondary coil or winding upon the core. The core comprises a laminated structure upon which the three phase primary windings are located. We propose to make the secondary winding in the form of cast copper loops which are preferably cast as separate pieces and thereafter placed upon the laminated structure. The secondaries may thus be utilized to clamp the laminations together. As an alternative one or more of the secondaries may be cast directly upon the laminated core. Wedges may be driven between the laminations at the ends in such a manner as to spread the laminations to produce a tight engagement between the cast secondary and the core structure. This construction eliminates the necessity for bolted clamping members used in ordinary transformer construction and firmly braces the secondary coils against magnetic reaction and results in a design of great ruggedness, simplicity and compactness.

The attainment of the above and further objects of the present invention will be apparent from the following specification taken in conjunction with the accompanying drawings forming a part thereof.

In the drawings:—

Figure 1:
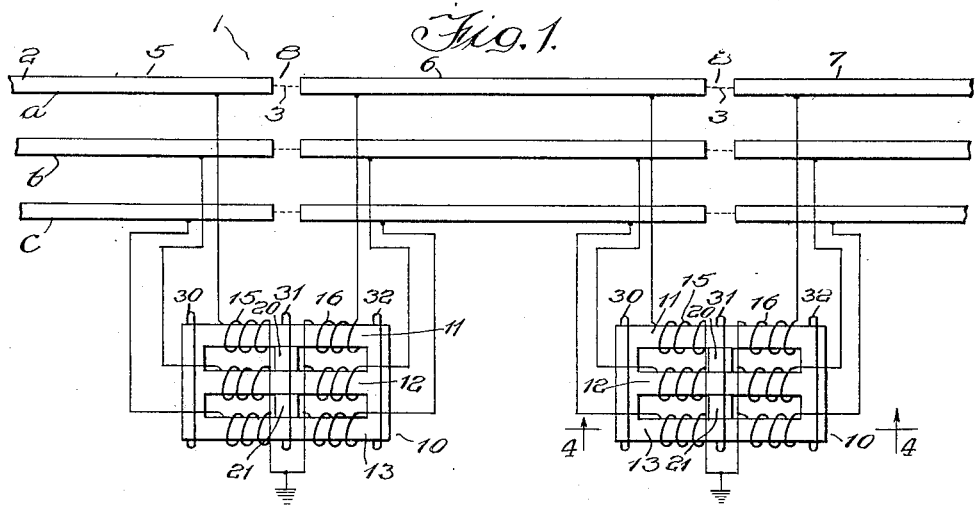
Figure 1 is a schematic wiring diagram of our improved sheath bonding arrangement.

Reference may now be had more particularly to Figure 1 wherein we show our invention as applied to a three-phase system. It is however to be understood that the present invention is not limited to such a system, but is equally applicable to systems of any other number of phases. A three-phase transmission system employing single-phase metal-sheathed cables is indicated at 1. Each of the cables comprises a sheath 2 of conducting material and a conductor 3. The sheaths of each cable are divided into sections insulated from one another and of a length usually equal to the distance between manholes. The sections are indicated at 5, 6, and 7, the respective sections being insulated from one another by suitable insulating joints 8. As stated above, each sheath section usually extends from one manhole to another, the insulating joints being located in the manholes in the customary manner, although the joints may also be located at other points if required. A transformer 10 of our improved construction is provided for interconnecting the ends of the cable sheath terminating at the first insulating joint 8. A similar transformer is provided at each insulating section. Each transformer is provided with three parallel core legs 11, 12 and 13 in a closed magnetic circuit. The core leg 11 includes a winding 15 at one end thereof and another winding 16 at the other end thereof. The other core legs 12 and 13 include similar primary windings at the two ends thereof. One terminal of the winding 15 is connected to the sheath of the "$a$" phase cable in section 5 and one terminal of the winding 16 is connected to the sheath of the "$a$" phase cable in the section 6. The windings on the core legs 12 and 13 are similarly connected to the sheath of the "$b$" and "$c$" phase sheaths. The other terminals of the six primary coils are electrically connected together establishing an electrical neutral point which is preferably grounded. Thus the three coils that are connected to the cable sheaths in section 5 constitute three primary coils of a transformer connected in star, and the same applies to the three coils at the other end of the transformer which are connected to the cable sheath in section 6.

Flux leakage blocks or shunts 20 and 21 are interposed between the three core legs 11, 12 and 13, preferably mid-way along their length. Because of these leakage blocks the magnetizing flux of the coil 15 need not necessarily traverse the coil 16. The same applies to the coils on the other two core legs. Hence, with the present construction, that half of the transformer 10 which is connected to the sheaths in section 5 is substantially independent of that half of the transformer which is connected with the sheaths of the section 6. Hence, with this construction, the two half transformers that are connected to the two ends of any cable length will always reduce the voltage to ground equally at each end, which means that each end of any cable length will have a voltage above ground equal to fifty per cent of the voltage induced in that length. This equality assumes, of course, that the transformers are all of identical construction or that they have nearly identical voltage-current excitation characteristics.

Since the half coils are all wound with the same polarity and since flux is proportional to voltage, it is evident that the magnetic flux flowing across the flux leakage paths 20 and 21 will correspond to the differences of half of the voltages induced in the two cable lengths which the transformer connects. As a maximum this differential flux would approach the value in any core leg. In ordinary practice, the two halves of the transformer are not called upon to operate at widely different voltages. Therefore, the cross sectional area of the flux leakage path need only equal that of the main core members and, in general, could even be somewhat less. Furthermore, it is unnecessary to interleave the laminations of the flux leakage blocks 20—21 with the laminations of the core legs. Instead, simple rectangular blocks of laminations can be set between the core legs at the proper places between the coils so long as the air gaps thereby introduced are not excessive.

Figure 2:
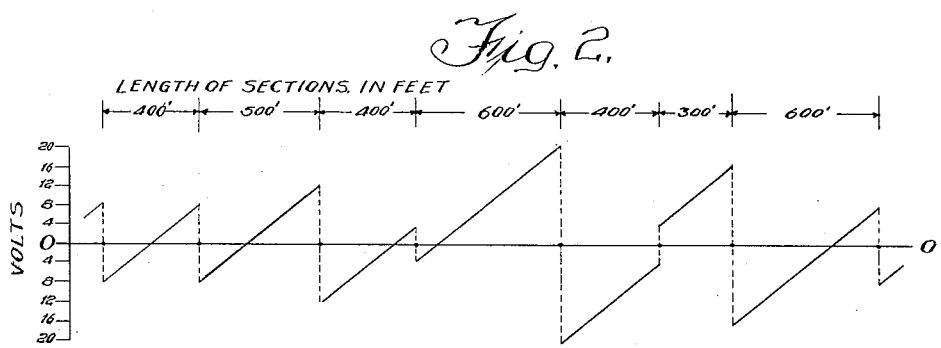
Figure 2 is a sheath voltage profile for one cable phase, indicating, in exaggerated form, distortion of voltage which may occur for a very unfavorable sequence of unequal conduit length in a system wherein there is a large mutual coupling between adjacent cable sections.
Figure 3:
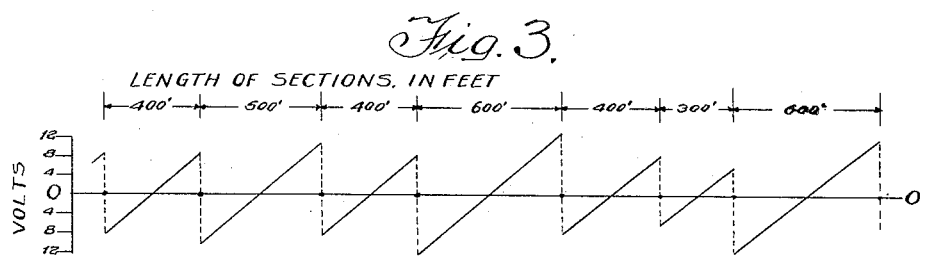
Figure 3 is a voltage profile which is obtained in a system such as shown in Figure 1.

In order to more clearly illustrate the manner of operation of our present invention reference may be had first to Figure 2 and then to Figure 3. Figure 2 shows a sheath voltage profile which will result from using bonding transformers with perfect mutual coupling between the two coils on each core leg, as would be approached if the flux leakage blocks 20 and 21 were omitted. Figure 3 shows a corresponding voltage profile in a system wherein there is no mutual coupling between the two coils on each core leg, a system which is very closely approached by using a transformer having flux leakage blocks as shown in Figure 1. These figures have both been drawn for the same system in which it is assumed that the cable spacing, conductor current, etc., are such that four volts are induced per one hundred feet of cable sheath. The sheath voltage profiles are each referred to ground potential as O—O. If the lengths between successive insulating sections are as indicated across the top of Figure 2 the dotted vertical lines will indicate the voltage across the transformer coils which are usually (although not necessarily) installed in consecutive manholes. The full slant lines indicate the voltages induced along the sheath lengths of consecutive sections for any one phase. If the figure is drawn to scale all such lines will have the same slope of four volts per one hundred feet.

With perfect mutual coupling between the coils the voltages across the coils 15 and 16 must be equal so that all vertical dotted line voltages must be bisected by the ground potential line O—O. Therefore, if the voltage is known at some point the complete voltage profile may be drawn in subject to bisection of vertical dotted lines and equal slope of full lines. This has been done in Figure 2 for a particularly unfavorable sequence of conduit lengths. It is obvious that the worst conditions will result when the difference between successive lengths is alternately plus and minus.

In actual field practice with transformers that do not have the flux leakage blocks the conditions are not so adverse as indicated by Figure 2, because the mutual coupling is not perfect and besides special means of bonding can be used to avoid or partly neutralize the effects of unfavorable sequence of section lengths.

Figure 3 shows the sheath voltage profile which is desired, and which is obtained by using transformers of a construction such as has been described above. In this figure the voltage induced in any sheath length is equally divided at the ends of the section. The maximum induced voltages to ground are everywhere reduced to half of the total induced voltage per sheath length. The voltages across the two coils such as 15 and 16 of Figure 1 are now not equal except in the event that the transformer interconnects sections of equal length. In order for the transformer to operate in this manner it is essential that the two coil windings on any one core leg be magnetically independent of one another and that the windings connected to the two ends of a sheath have similar voltage current excitation curves. The first condition is accomplished by the construction disclosed above and the second condition by using transformers of uniform size and design throughout the system.

The above discussion has reference only to the operation of the system during normal conditions. In order to secure certain advantages during abnormal conditions the transformer 10 is provided with one or more secondary windings indicated at 30, 31 and 32. Each of these secondaries comprises a single turn of copper in the form of a closed loop. Each of these turns constitutes, in effect, a delta connected winding, as has been pointed out in our above referred to applications. The electrical function and operation of the secondary windings are identical in principle and action to that of the secondaries disclosed in our above referred to applications and they need not be further discussed here. It may, however, be well to point out that the normal three-phase reactions of the primary coils are high, and only a small exciting current flows, whereby the transformer losses are, during ordinary operating conditions, negligible. Under such conditions the secondary coils function to prevent the flow of triple harmonic current in the sheaths, since the vector sum of the line frequency voltages impressed on the three primary coils at either side of the transformer is zero, whereas the vector sum of the triple harmonic is not zero.

When a fault occurs on one of the lines there will be a greater voltage induced in the corresponding cable sheath than in the other sheath. The vector sum of the currents flowing in the three primary windings of the corresponding half of the transformer will not be zero and a voltage will be induced in the secondary. Due to the fact that the secondary comprises a short circuited coil of low resistance there will be a very large current flow in the secondary with the result that the primary impedance is reduced to a very low value for this unbalanced current. The transformer will therefore act as a short circuit to the excess sheath voltages induced in the sheath of the cable carrying the fault current, thereby preventing or neutralizing excess induced sheath voltages. The secondary winding thus causes the transformers to act as ordinary short circuited transformers at very low impedance.

Figure 4:
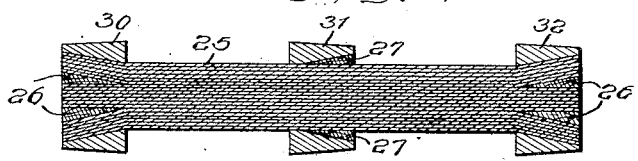
Figure 4 is a sectional view of our improved transformer, such view being taken along the line 4—4 of Figure 1.

Figure 4 shows a longitudinal section through one form of transformer constructed in accordance with our invention. The secondary consists of three copper conductor bars 30, 31 and 32 which are precast and assembled on the core. One side of the laminated core structure is indicated at 25. When the transformer is constructed in this form the bar secondary winding occupies space which would otherwise be unoccupied. Furthermore, the secondary bars are utilized to clamp the core laminations together and hold the leakage flux blocks in place. In order to better accomplish this, wedge blocks 26—26 are driven between the laminations and the ends of the core structure in such a manner as to spread them in the end secondary bars. Likewise, wedges 27 are driven between the cast secondary 21 and the laminated structure to provide a rugged assembly. This construction eliminates the necessity for bolted clamping members used in ordinary transformer construction and firmly braces the secondary coils against magnetic reaction. It also results in a design of great ruggedness, simplicity and compactness.

It is to be noted that the secondary winding 30 is effective for the left hand end of the transformer, the secondary 32 is effective for the right hand end of the transformer, and the secondary 31 is in common for the two transformer halves. If desired, the windings 30 and 32 may be omitted or, as an alternative, the winding 31 may be omitted. However, we prefer an arrangement wherein all three of the windings are present.

It is further to be noted that, insofar as the operation of the system is shown and Figure 1 is concerned, the windings 30, 31 and 32 may be replaced by two sets of delta connected windings, one set upon the right hand end of the three core legs and the other set upon the left hand end of the three core legs. The short circuited coils are the full equivalent of such windings, as pointed out in our above referred to applications.

In compliance with the requirements of the patent statutes, we have herein shown and described a preferred embodiment of our invention, both as to circuit connections and as to mechanical arrangement of the transformers used. The present invention is, however, not limited to the precise arrangement herein shown, the same being merely illustrative of the broad principles of the invention. What we consider new and desire to secure by Letters Patent is:—

1. A polyphase line including a plurality of sheathed cables, the cable sheaths of said line being divided into lengths separated from one another by insulation, each length having, at each end thereof, reactance means interconnecting the respective sheaths and connecting them to ground, the reactance means connected to adjacent cable lengths at an insulating section being electromagnetically independent of one another.

2. A polyphase line including a plurality of sheathed cables, the cable sheaths of said line being divided into lengths separated from one another by insulation, each length having, at each end thereof, reactance means interconnecting the respective sheaths and connecting them to ground, the reactance means connected to adjacent cable lengths at an insulating section being electromagnetically independent of one another, the reactance having a high value during normal operating conditions, and means effective upon the occurrence of unbalanced conditions for substantially reducing the reactance.

3. In a three-phase system, separate sheathed cables for the respective phases, each sheath being divided into sections insulated from one another, six coils connecting the respective ends of the sections at a sheath insulating point to ground potential, three of the coils being magnetically coupled together and the other three coils being magnetically coupled together substantially independent magnetically of the first three coils.

4. In a three-phase system, separate sheathed cables for the respective phases, each sheath being divided into sections insulated from one another, six coils connecting the respective ends of the sections at a sheath insulating point to ground potential, three of the coils being magnetically coupled together and the other three coils being magnetically coupled together substantially independent magnetically of the first three coils, said coils having under normal operating conditions a high reactance, and means effective upon the occurrence of unbalanced conditions for reducing their reactance.

5. A polyphase power system comprising a separate metallic sheathed cable for each phase, each of the cable sheaths comprising a number of sections, grounded means at each end of each section each for balancing the voltages of the respective cable sheaths in the section against one another, said grounded balancing means at adjacent ends of adjacent sections being substantially magnetically independent of one another.

6. A polyphase power system comprising a separate metallic sheathed cable for each phase, each of the cable sheaths comprising a number of separate sections, means for balancing the voltages of the respective sheaths at one end of a section against one another, said means being substantially magnetically independent of the sheath voltage of the adjacent end of the adjacent section.

7. An alternating current line including a plurality of metal sheathed cables and, at certain spaced points on the line, insulation interrupting the electrical continuity of each sheath thereby dividing the sheaths of the line into a plurality of lengths, the respective cable conductors being electrically continuous throughout the lengths, a plurality of magnetically coupled coils grounding the sheaths at one end of one length, a similar set of coils grounding the sheaths at the opposite end of the same length, and a similar set of coils grounding the adjacent ends of the sheaths of an adjacent length, the adjacent sets of coils of the two lengths being magnetically separate from one another.

8. An alternating current line including a plurality of metal sheathed cables and, at certain spaced points on the line, insulation interrupting the electrical continuity of each sheath thereby dividing the sheaths of the line into a plurality of lengths, the respective cable conductors being electrically continuous throughout the lengths, a plurality of magnetically coupled coils grounding the sheaths at one end of one length, a similar set of coils grounding the sheaths at the opposite end of the same length, a similar set of coils grounding the adjacent ends of the sheaths of an adjacent length, the adjacent sets of coils of the two lengths being magnetically separate from one another, each set of coils comprising the primary winding of a transformer, and a short circuited secondary coil in common to the two adjacent sets of coils.

9. An alternating current line including a plurality of metal sheathed cables and, at certain spaced points on the line, insulation interrupting the electrical continuity of each sheath thereby dividing the sheaths of the line into a plurality of lengths, the respective cable conductors being electrically continuous throughout the lengths, a plurality of magnetically coupled coils grounding the sheaths at one end of one length, a similar set of coils grounding the sheaths at the opposite end of the same length, a similar set of coils grounding the adjacent ends of the sheaths of an adjacent length, the adjacent sets of coils of the two lengths being magnetically separate from one another, each set of coils comprising the primary winding of a transformer, a short circuited secondary coil in common to the two adjacent sets of coils, and additional short circuited secondary windings individual to the respective sets of coils.

10. An alternating current line including a plurality of metal sheathed cables and, at certain spaced points on the line, insulation interrupting the electrical continuity of each sheath thereby dividing the sheaths of the line into a plurality of lengths, the respective cable conductors being electrically continuous throughout the lengths, a plurality of magnetically coupled coils grounding the sheaths at one end of the length, a similar set of coils grounding the sheaths at the opposite end of the same length, a similar set of coils grounding the adjacent ends of the sheaths of an adjacent length, the adjacent sets of coils of the two lengths being magnetically separate from one another, the coils of each set having a comparatively high reactance under normal operation of the line, and means effective responsive to the occurrence of an unbalanced condition for substantially reducing the reactance of the coils connected to the length where the unbalance exists.

In witness whereof, we hereunto subscribe our names this 11th day of March, 1931.

HERMAN HALPERIN.
KENNETH W. MILLER.